(12) United States Patent
Crosby et al.

(10) Patent No.: US 8,906,283 B2
(45) Date of Patent: Dec. 9, 2014

(54) STIMULI-RESPONSIVE SURFACES AND RELATED METHODS OF FABRICATION AND USE

(75) Inventors: Alfred J. Crosby, Amherst, MA (US);
Douglas P. Holmes, Amherst, MA (US);
Edwin P. Chan, Cambridge, MA (US);
Charles J. Rand, Amherst, MA (US);
Kyriaki Kalaitzidou, Amherst, MA (US)

(73) Assignee: University of Massachusetts, Boston, MA (US)

( * ) Notice: Subject to any disclaimer, the term of this patent is extended or adjusted under 35 U.S.C. 154(b) by 1777 days.

(21) Appl. No.: 12/012,643

(22) Filed: Feb. 5, 2008

(65) Prior Publication Data

US 2011/0062635 A1 Mar. 17, 2011

Related U.S. Application Data

(60) Provisional application No. 60/899,725, filed on Feb. 5, 2007.

(51) Int. Cl.
*B29C 59/02* (2006.01)
*G02B 3/14* (2006.01)
*B29C 53/02* (2006.01)
*G02B 3/00* (2006.01)

(52) U.S. Cl.
CPC . *G02B 3/14* (2013.01); *B29C 53/02* (2013.01); *G02B 3/0056* (2013.01)

USPC .......................................................... 264/320

(58) Field of Classification Search
USPC .......................................................... 264/320
See application file for complete search history.

(56) References Cited

U.S. PATENT DOCUMENTS 6,060,159 A 5/2000 Delgado et al.

OTHER PUBLICATIONS

Chan et al. "Spontaneous formation of stable aligned wrinkling patterns" Soft Matter 2006, 2, 324-328.*
Forterre et al. ("How the Venus flytrap snaps" Nature 2005, 433: 421-425).*
Holmes et al. ("Venus Flytrap Inspires Adaptive Optics" science. nchc.org.tw 2005). Power-point presentation.*
Holmes, DP; Ursiny, M; Crosby, AJ. Crumpled surface structures. Soft Matter, 2008, 4, pp. 82-85. First published as an Advance Article on the web Nov. 5, 2007, DOI: 10.1039/b712324h.
Holmes, DP; Crosby, AJ. Snapping Surfaces. Adv. Mater. 2007, 19, pp. 3589-3593.
Gecko Feet Hold the Key to Self-Cleaning Adhesives. http://www.avs.org/news.popup.aspx?article=37. Research published online in early edition of PNAS (www.pnas.org) during the week of Jan. 3, 2005 (Article #08304: "Evidence for self-cleaning in gecko setae").

* cited by examiner

*Primary Examiner* — Larry Thrower
(74) *Attorney, Agent, or Firm* — Cantor Colburn LLP

(57) ABSTRACT

Biomimetic stimuli-responsive surfaces and articles of manufacture, together with methods of fabrication and related methods of use.

11 Claims, 9 Drawing Sheets

Figures 13A-C

Figure 1:
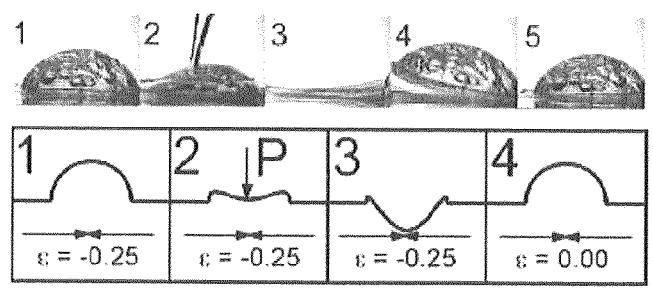

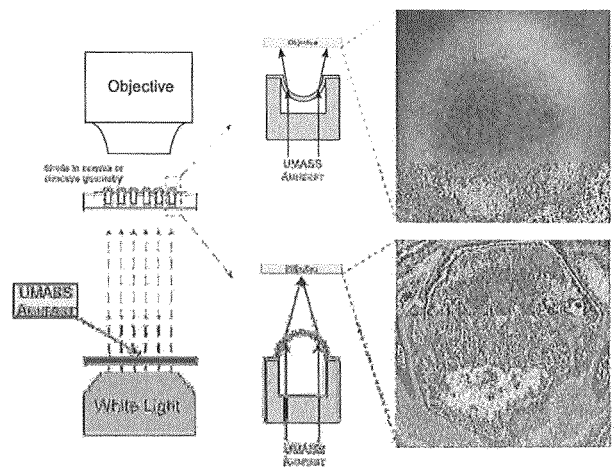
Figure 14
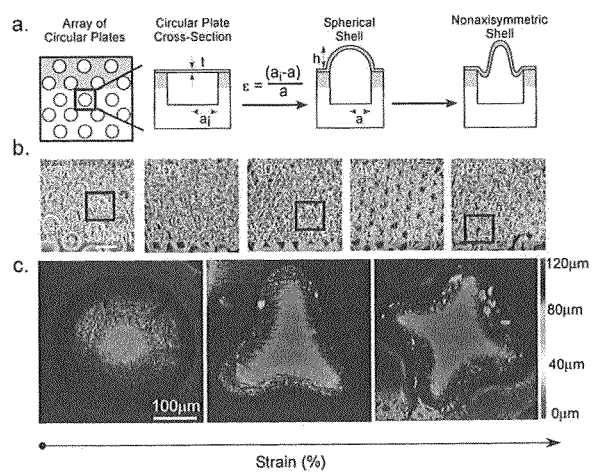
Figure 15A
Figure 15B
Figure 15C

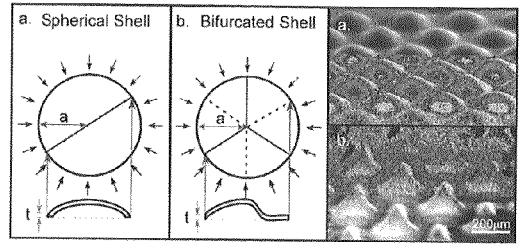
Figure 16A  Figure 16B  Figure 16B
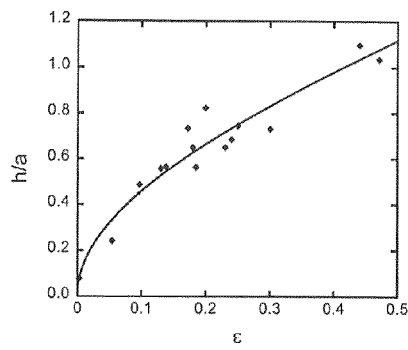
Figure 17A
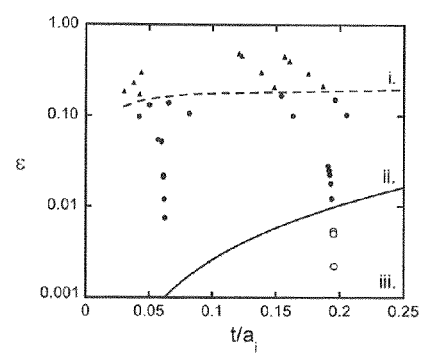
Figure 17B
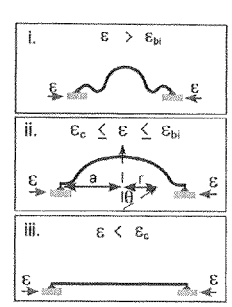
Figure 17C
Figure 18A
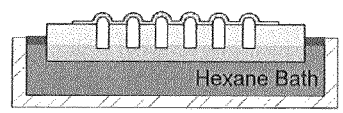
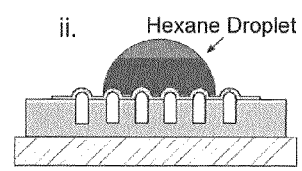
Figure 18B
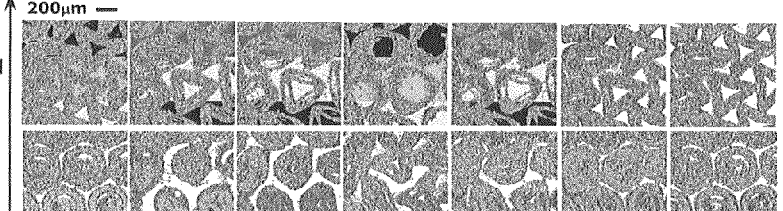

STIMULI-RESPONSIVE SURFACES AND RELATED METHODS OF FABRICATION AND USE

This application claims priority benefit from provisional application Ser. No. 60/899,725 filed on Feb. 5, 2007, the entirety of which is incorporated herein by reference.

The United States government has certain rights to this invention pursuant to Grant No. W911NF-05-1-0559 P00001 from the United States Department of the Army to the University of Massachusetts.

BACKGROUND OF THE INVENTION

Responsive material surfaces have been recently developed in several forms to provide a multitude of functions ranging from chemical sensors to adhesion modifying layers. Two primary routes have been used to achieve these stimuli-responsive surfaces: material phase-transition and environment-selectivity. Material phase transition tends to be a slow, non-sensitive, process with limited timing ability that can be used to change the shape of features on surfaces (e.g., shape memory alloys or shape memory polymers). From another perspective, depending upon a particular system, phase transition can lead to and present a change in chemical species on the material surface, thereby introducing an unwanted variable. Environment selectivity primarily relates to the conformation of polymers or small chain molecules fixed to or near a material surface. In these systems, a preferential solubility for a chemical group in the molecule in the surrounding environment will cause this chemical group to present itself at the surface. However, such techniques also present time-scale, sensitivity and related issues. As a result, the search for an alternate approach to stimuli-responsive surfaces remains an ongoing concern in the art.

SUMMARY OF THE INVENTION

In light of the foregoing, it is an object of the present invention to provide various stimuli-responsive surfaces, apparatus and related methods, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a stimuli-responsive surface operative on a time scale faster than that available through phase transition systems of the prior art.

It can also be an object of the present invention to provide a stimuli-responsive surface and/or related method of use to effect surface response without corresponding chemical change.

It can also be an object of the present invention to provide a stimuli-responsive surface, apparatus and/or related methods of use and fabrication affording alternate design options and tunability over a range of parameters unrelated to chemical identity or molecular conformation.

Other objects, features, benefits and advantages of the present invention will be apparent from this summary and the following descriptions of certain embodiments, and will be readily apparent to those skilled in the art having knowledge of various stimuli-responsive surface components and assembly/production techniques. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to a method of altering or effecting surface response to an external stimulus. Such a method can comprise providing a first surface component comprising a plurality of structural components thereon, each said structural component comprising a defined first or initial geometry; and stimulating at least one said structural component for a time and to an extent or of a magnitude at least partially sufficient to induce a non-linear geometric displacement thereof. In certain non-limiting embodiment, such a structural component can be characterized by a combination comprising material identity, length scale and a defined geometric configuration. Such a stimulus can, without limitation, comprise mechanical force or pressure, temperature, pH, solvent swelling, magnetism, electric field and/or radiation on one or more structural components. Regardless, such a stimulus can induce snap through elastic instability in the structural component. As illustrated below, in certain embodiments, a structural component can comprise a first geometry or configuration selected from but not limited to a spherical shell, a buckle and a tubular column. Upon stimulation, such a component can invert or buckle or otherwise assume a second geometry or configuration. Application of a counter stimulus can restore the first geometry/configuration, optionally for subsequent stimulation and/or displacement cycle(s).

As can relate to one or more end-use applications, a first surface component can contact a second surface component thereon, connected therewith or otherwise coupled thereto, and stimulation of the structural components can affect interfacial contact of or adhesion between the surface components. In certain embodiments, the second surface component can be selected from an underlying substrate and a coating on or coupled to the first surface component. Regardless, response to a stimulation can be a factor of density, length scale and/or dimension(s) of the structural components.

Alternatively, this invention can be directed to a method of using elastic instability to alter surface topography. Such a method can comprise providing a surface component comprising at least one structural component thereon, each said structural component as can comprise a material of a length scale and in a defined geometry; and applying a stimulus to the structural component(s) for a time and to an extent or of a magnitude at least partially sufficient to induce elastic instability or a snap through elastic instability in the structural component(s). In certain non-limiting embodiments, as demonstrated below, the structural component(s) can comprise a spherical shell geometry which can be inverted upon pressure or solvent application.

Regardless, in certain embodiments, a surface component can comprise a coating component on or coupled thereto, and an induced instability can affect contact and/or adhesion between the surface and the coating. In certain other embodiments, the surface component can comprise extraneous (e.g., environmental or relating to end-use application) particulate deposition thereon. Pressure/force or another stimulus can then be applied at a frequency coincidental with a degree or rate of the deposition, to affect particulate adhesion to the surface and/or removal therefrom.

In part, this invention can also comprise a stimuli-responsive surface article comprising a substrate and a surface component comprising one or a plurality of 3-dimensional structural components integral therewith and/or thereon, each such structural component comprising a defined, curved geometric configuration, length scale and a material identity, each said structural component combination at least partially sufficient for snap transition through an elastic instability responsive to external stimulus application. In certain non-limiting embodiments, the structural components can comprise a predetermined pattern and/or dimension(s) or—with respect to a surface component—a density and/or length scale. For instance, without limitation, such structural components can comprise a plurality of axisymmetric and/or non-axisymmetric configurations, e.g. spherical shells (convex and/or concave), bifurcated shells, buckles and tubular columns and combinations thereof. More generally, structural component geometry and/or configuration is limited only by fabrication technique employed. Application of a stimulus, including but not limited to one or more of those described above or elsewhere herein (e.g., mechanical pressure, etc.), can deform or invert such a geometry, while a counter stimulus can restore initial configuration.

Regardless of geometry, structural components of such an article can comprise an elastomeric polymer or another material suitable for a particular end-use application. In certain such embodiments, with extraneous particulate (e.g., microbial) deposition on a surface component, a stimulus can be applied at a frequency coincidental with a degree or rate of deposition to affect particulate adhesion and/or surface removal.

While such articles can be prepared or fabricated using any technique or process known in the art, certain articles—depending upon structural component and/or geometric configuration or particular end-use application—can be prepared as described herein. Accordingly, this invention can also be directed to a method of preparing a 3-dimensional stimuli-responsive surface component or any such article. Such a method can comprise providing a substrate comprising opposed first and second surfaces and an array of recesses or deformations in the first surface; inducing a biaxial strain on the substrate; coupling a coating component to the first substrate surface, such coupling peripheral to and/or about the recesses/deformations; and transferring the biaxial strain to the coating component, such a transfer generating a surface comprising an array of 3-dimensional geometric configurations on the substrate. As illustrated elsewhere herein, such strained geometric configurations can be responsive to an external stimulus.

In certain embodiments, such a biaxial strain can be induced by a positive pressure applied to the second surface of the substrate. In certain such embodiments, such a positive pressure can be air pressure applied to the second surface of the substrate, opposite the first surface recesses/deformations. Regardless, in certain embodiments, the recesses can be holes in the substrate, such holes as can comprise substantially circular cross-sectional openings. Upon transfer of biaxial strain, a surface comprising an array of axisymmetric and/or non-axisymmetric geometries or configurations can be generated. Without limitation as to geometry or configuration, such an array can comprise a predetermined pattern, the density of which can be used to alter geometric configuration upon application of an external stimulus.

DETAILED DESCRIPTION OF THE DRAWINGS

FIG. 1. Preliminary results demonstrating the setting and triggering of the snap-through of an elastomeric, PDMS shell.

Figure 2:
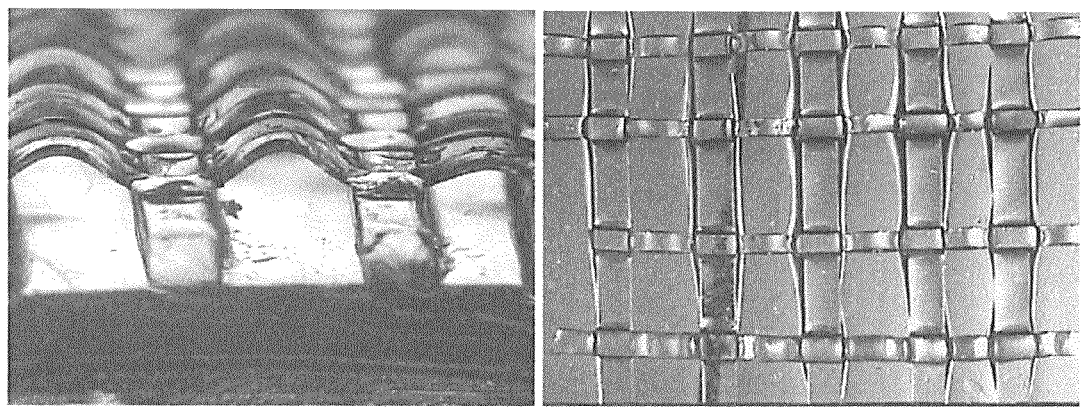

FIG. 2. Two optical images illustrate one example of a possible surface array of buckles. The image on the left shows a side view of the surface while the image on the right is looking down onto the surface. The density and size of the features on the surface can be tailored for specific applications.

Figure 3:

FIG. 3. An example of mechanical pressure causing one buckle on a surface to undergo a "snap-through" transition.

Figure 4:
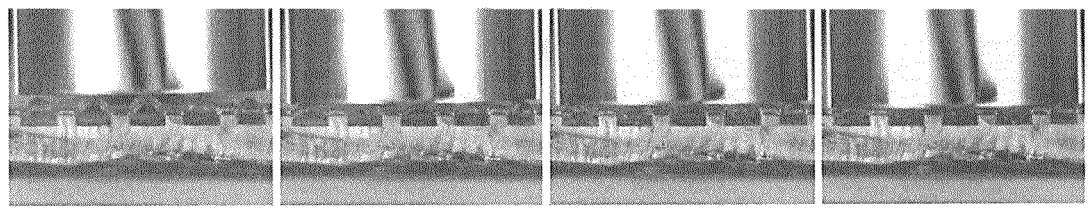

FIG. 4. An example of mechanical pressure causing multiple buckles on a surface to undergo a "snap-through" transition.

Figure 5:
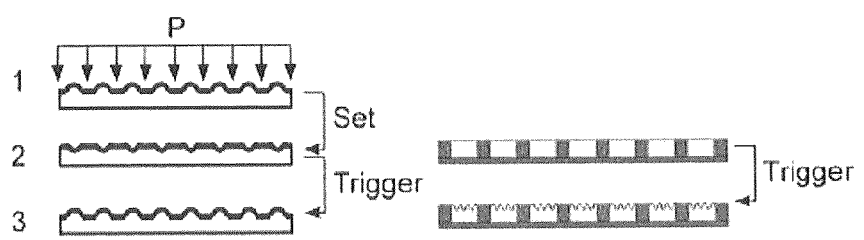

FIG. 5. A schematic illustration of two alternate controlled instabilities useful for responsive interfaces.

FIGS. 6A-G. A schematic representation of one method for preparing an array of shells on a surface, in accordance with this invention.

Figure 6:
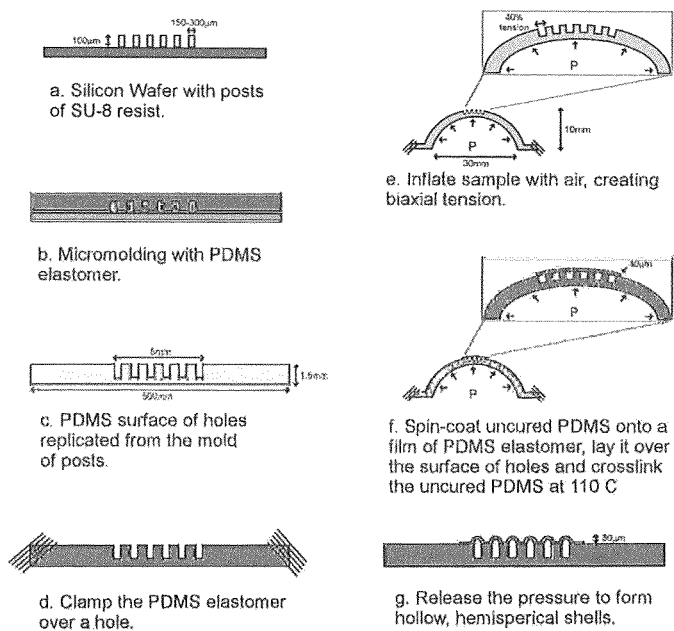
Figure 7:
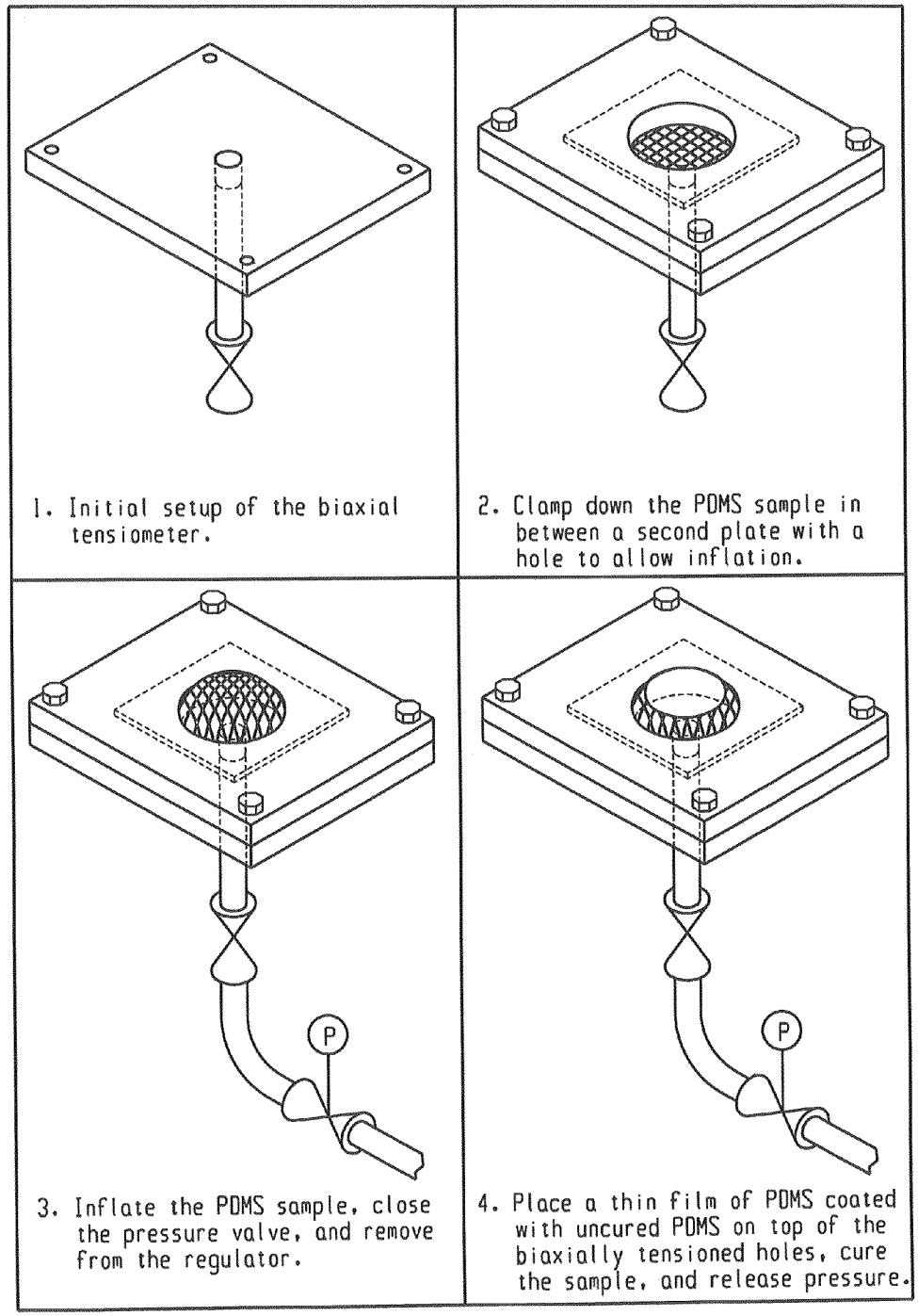

FIG. 7. The biaxial tensiometer used to prepare the surface of shells of FIG. 6.

Figure 8:
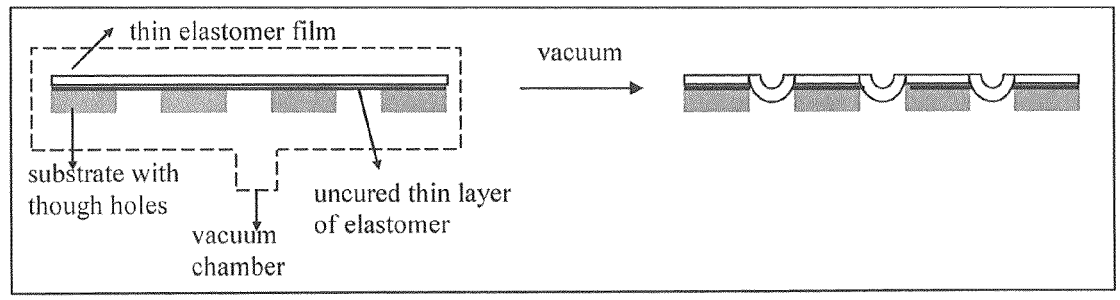

FIG. 8. A schematic illustration of a vacuum process used for creating the shell decorated surface.

Figure 9:
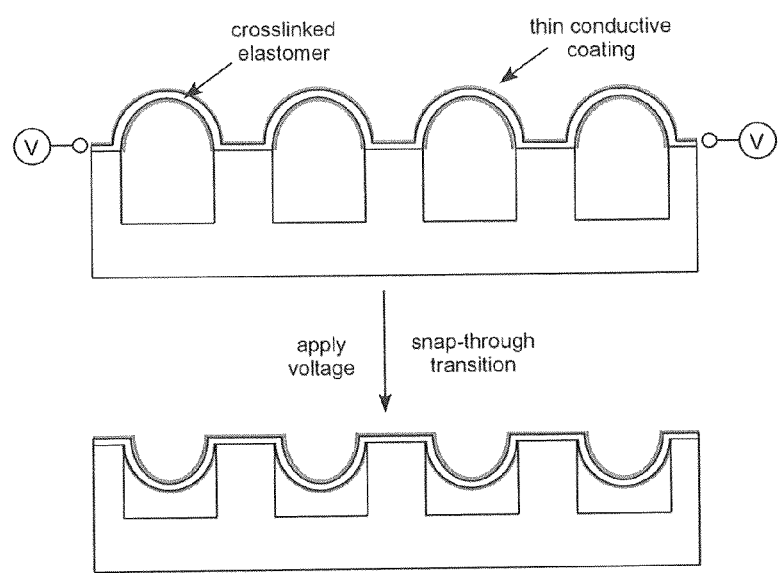

FIG. 9. A schematic of the "snap through" transition due to application of voltage, in accordance with one embodiment of this invention.

Figure 10A:
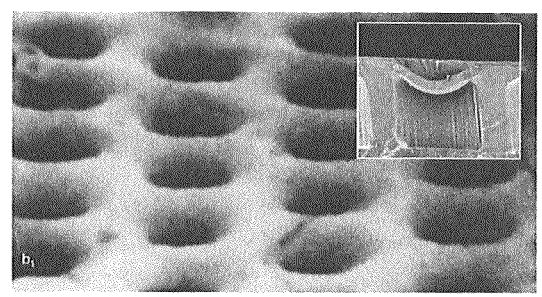
Figure 10B:
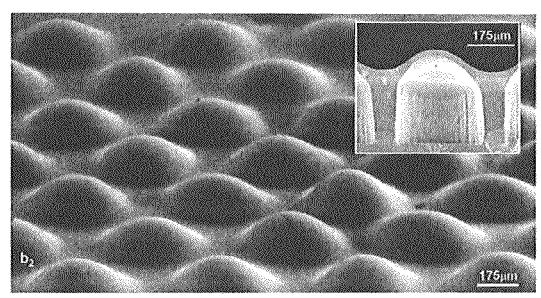

FIGS. 10A-B. Optical images of a surface component with an array of concave (A) and convex (B) shells.

Figure 11:
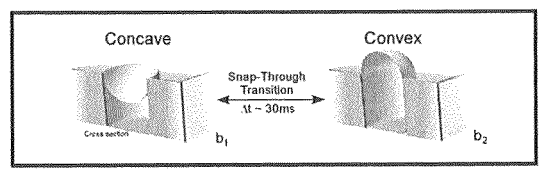

FIG. 11. An illustration of a transition from one shell configuration to another.

Figure 12A:
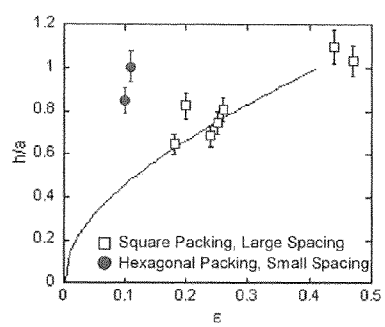

FIG. 12. A) A graph of h/a vs. strain to illustrate predictable control of shell curvature; and B) A schematic of using a concentrated point force to snap an individual shell, along with a force vs. displacement plot illustrating the critical force of snap-through.

Figure 13A:
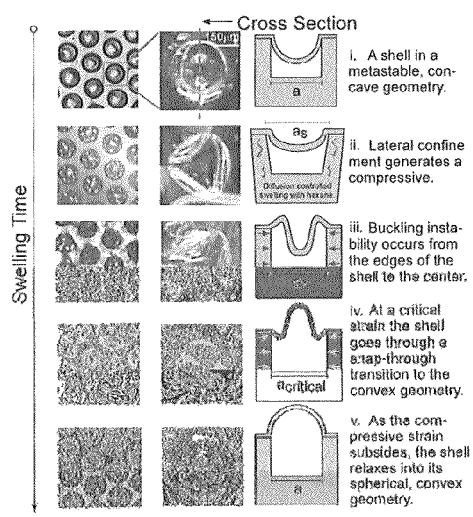
Figure 13B:
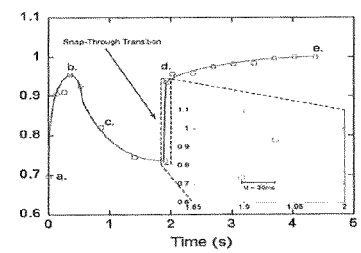
Figure 13C:
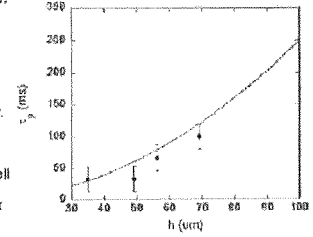

FIGS. 13A-C. A) Images of the responsive surface snap-through process as well as a schematic illustrating the snap-through transition of a single shell from concave to convex, triggered by the development of osmotic stress, due to the swelling of the PDMS network with hexane; B) A corresponding strain vs. time graph illustrating the snap-through transition; and C) A plot of snap-through time vs. film thickness.

FIG. 14. Demonstration of optical functionality of microlens shells and their ability to change focal properties upon triggering. In the arrangement illustrated schematically on the left, no image is projected onto the objective when the shell curvature is concave. Upon triggering, the shell transitions to convex and an image is focused at the focal point of the microscope objective.

FIGS. 15A-C. A) A schematic illustrating an array of individual circular plates and plate buckling from applied compressive strain; B) Optical images of microstructure morphology as the applied biaxial strain is increased; C) Confocal microscopy images of spherical and bifurcated shells.

FIGS. 16A-C. Buckling schematic illustrating various plate budding possibilities, where A) illustrates a plate that buckles to form an axisymmetric, spherical shell; and B) show spherical shells that have bifurcated and exhibit circumferential waves, or folds dictated by the packing density of the shells; C) SEM images of spherical and nonaxisymmetric shells are presented in A & B.

FIGS. 17A-C. A) The prediction of aspect ratio from the applied biaxial strain on the surface of the substrate; B) A phase map demonstrating the budding modes of a circular plate under compression. In region iii. the ratio of plate thickness to radius is too high to buckle, as predicted by classical plate theory, in region ii. the plates buckle and form axisymmetric, spherical shells, while in region i. the spherical shells bifurcate to form nonaxisymmetric geometry. The dashed line separating regions i. and ii. was determined empirically. The open circles represent experimental data for plates that did not buckle, the filled circles represent plates that buckled to form spherical microlenses, and the triangles indicate shells that bifurcated into nonaxisymmetric microstructures; C) A schematic illustrating regions i, ii, iii.

FIGS. 18A-B. A) A schematic illustrating two ways (i. and ii.) responsive behavior in the microstructures; B-i) The responsiveness of convex shells that are initially nonaxisymmetric and form spherical shells as the substrate swells with hexane; B-ii) Shells that are initially spherical bifurcate to form nonaxisymmetric geometries when the shells are swollen with hexane.

DETAILED DESCRIPTION OF CERTAIN EMBODIMENTS

As a basis for understanding certain embodiments of this invention, consider that the potential energy map of most systems has several paths of equilibrium, some that are stable and others that are unstable. In structural mechanics, the most common example of an unstable path of equilibrium configuration is the buckling of a structural member, such as a beam, plate, or shell. Buckling occurs as a structural member is loaded and the application of a critical force causes a non-linear increase in geometric displacement. Perhaps, the most classic example of structural instability, or buckling, is attributed to the analysis of Euler in 1759 as he described the geometrically non-linear deformation of an axially loaded column. Euler determined that at a critical applied load, the equilibrium force-displacement path reaches a bifurcation point. This critical load is given by the following equation:

$$P_{critical} = \frac{\pi^2 EI}{L^2} \quad (1)$$

where E is the elastic modulus of the material, I is the moment of inertia for the column shape, and L is the length of the column between pinned boundary conditions. At this point, the loaded column can continue on a stable equilibrium or follow an unstable equilibrium deformation path. The choice of path is determined by the presence of geometric imperfections in structure or loading, and, in practical terms, these imperfections cannot be avoided. Thus, at this critical load, or the Euler criterion, the deformation follows a buckled geometry. As equation (1) demonstrates, this transition force from one geometric configuration to another can be tuned by the mechanical properties of the material, as well as the geometric dimensions of the structure. This general relationship between geometric structure and material properties transcends the stability of columns and is a common thread in the definition of most structural components, including plates and shells. In these and other structures, remarkable geometric changes can take place in very sensitive manners and over short time scales.

Accordingly, an alternative approach for the design of responsive interfaces can involve the use of elastic instabilities, such as buckling, to rapidly change the topography of an interface. Elastic instabilities can be considered as sudden geometric changes that occur at a critical stress to minimize deformation energies in a structure. As mathematically illustrated, above, a classic example of a simple elastic instability is the buckling of an axially-loaded column under compression. At this critical force, the straight column spontaneously transforms into a sinusoidal shaped column with its wavelength defined by the column geometry and boundary conditions.

Another example of an instability is the buckling, or "snap-through," of a spherical cap membrane. In FIG. 1, a thin, membrane of a crosslinked elastomer has been molded into the shape of spherical shell (Frame 1). Upon the application of a small compressive force (applied manually with the touching of tweezers in Frame 2), the spherical membrane is inverted (Frame 3). Upon the application of a small tensile strain to the membrane, the spherical shape instantaneously recovers (Frame 4). The transition from Frame 3 to Frame 4 in real time is on the order of 0.06 seconds. This transition is remarkably fast and sensitive, and can be triggered by manual application of mechanical strain. Other triggers or stimuli can also be used to induce such instabilities. The timescale for "snap-through" can be represented as $\tau \sim (L^2/h)(\rho/E)^{1/2}$, where L is the base diameter, h is the thickness, $\rho$ is the density, and E is the elastic modulus. Through modifications in geometry and material properties, the time scale and forces associated with the transition can be tuned or modified for a particular use or application.

In one embodiment, a surface can be provided with integrated structures of such shells (or, e.g., plates, buckles or columns). (See FIGS. 2-4.) Upon application of a given stimulus (e.g., weight, light, chemical, thermal) the structures can spontaneously transform their shape due to the onset of an elastic instability. Such shells (e.g., of configurational dimension(s) and/or length scales(s) ranging from nanometer dimension to centimeter dimension) can be integrated onto a material surface. The shape transition of the material surface induced by a "snap-through" event can be used for several purposes, as discussed below. With reference to a non-limiting end-use application, this shape transition can cause the immediate debonding of a coating that is applied above these structures, can activate an electrical signal to trigger a warning signal, can change the reflectivity of a surface, or can simply change the adhesion quality of a surface—among many other available applications.

Nano- and micro-lithography and other technologies of the sort known in the art (e.g., photolithography, imprint lithography, ion beam patterning and stereo lithography, etc.) can be used to fabricate the present structures that can be sensitively triggered to alter the topographic nature of an interface or a surface. Specifically, as illustrated elsewhere, surface structures can be fabricated from Pt-catalyzed crosslinked poly(dimethyl siloxane), photocrosslinked poly(n-butyl acrylate), and elastomeric block copolymers of polystyrene-b-polybutadiene. These materials are amenable to nano-imprint lithography techniques, are model materials for future applications, and offer a wide range of elastic and viscoelastic mechanical responses coupled with tunable interfacial properties. Other material choices include poly(ethylene-oxide) block copolymers, poly(n-isopropylacrylamide) hydrogels, and poly(methyl methacrylate)-b-poly(n-butyl acrylate) tri-block copolymers. Additional material choices include glassy polymers such as but not limited to polystyrene, poly(methyl methacrylate) and copolymers thereof and semi-crystalline polymers such as but not limited to poly(vinyl alcohol) and copolymers thereof. These polymers present a wide range of surface and bulk properties, while providing direct impact on potential technologies. For example, PEO-based block copolymers are used to create dynamic antimicrobial surfaces that self-clean upon command to maintain their effectiveness. Poly(n-isopropylacrylamide) gels are popular candidates in the process of cell sheet harvesting for tissue engineering. Responsive interfaces of this material can control the initiation and propagation mechanisms upon cell sheet release, thus ensuring the integrity and vitality of the cell sheet. Responsive interfaces made from PMMA-PnBA copolymers, due to their compatibility with acrylate-based coatings, can be used in the development of "smart" coatings for the stripping of protective coatings without the use of hazardous solvents. These materials are commercially available or can be synthesized using standard laboratory procedures.

Two representative geometries are illustrated in FIG. 5, and present straightforward processing approaches allowing focus on the impact of material properties on the responsive action of the structured surfaces. To fabricate microspherical shells, photolithography and imprint lithography can be used to first prepare microlenses. Whether obtained from commercial sources or prepared via a photoresist reflow process, through traditional moldmaking procedures, the positive microlenses can be transferred to a negative mold made from a solvent resistant silicone elastomer. Into this mold, a controlled amount of pre-crosslinked polymer can be placed. Prior to crosslinking this polymer layer, the positive microlenses (used to form the negative mold) can be pressed into the polymer filled negative mold. By controlling the applied displacement of the positive microlenses, the thickness of the polymer filled layer can be controlled. After curing the polymer filled layer, the positive microlenses and negative mold can be separated to yield a surface of microspherical shells. This entire process is controlled on a nanopositioner-controlled platform to ensure proper lateral and normal alignment. A similar procedure was used to fabricate that crosslinked PDMS shell in FIG. 1. Once the microspherical shells are fabricated, a normal pressure is applied (similar to FIG. 1) by a controlled nanopositioner to invert the spherical shells. In the inverted geometries, different triggers such as swelling, applied mechanical strains, and thermal expansion can be used to switch the inverted spherical shells to positive microlenses on a surface.

Similar approaches and triggers are used to fabricate and demonstrate another geometry illustrated in FIG. 5. Such a geometry produces a buckled configuration similar to the wrinkling of paper. A thin plate of a crosslinked elastomer (e.g., PDMS or PnBA) is deposited onto a rigid or flexible substrate with surface holes. Assuming adhesion between the crosslinked elastomer plate and the substrate surface, upon mechanical compression or swelling of the elastomer, the plate sinusoidally buckles. The dynamics and length scale of the buckled deformation waves are dependent upon the mechanical properties of the plate, the thickness of the plate, and the diameter of the surface holes on the substrate.

A surface of shells can be fabricated in a variety of ways, and is not limited to any one material or technique. One such technique, in accordance with this invention, involves the preparation of a surface of hemispherical, elastomeric shells (See FIGS. 6A-G). In one such method, a silicon wafer is patterned with cylindrical posts using a photoresist. Post heights and diameters typically range from, but are not limited to, nanometers to hundreds of microns. Using a micromolding technique, a polydimethylsiloxane (PDMS) elastomeric prepolymer is molded over the array of posts, then thermally crosslinked to leave an elastomeric array of holes. The thickness of this PDMS film is typically 10 times greater than the height of the posts, but can vary depending on the particular embodiment of the surface. The PDMS film is then clamped over a circular hole and inflated with air until the desired biaxial tension is achieved. (FIG. 7 shows an example of a biaxial tensiometer, of the sort used in the art for sample preparation.) The holes on the surface of the film are in equibiaxial tension (typically less than 40%, but higher tension may be desired to prepare surfaces with different shaped structures). A film of PDMS, with a thickness usually on the same order of magnitude as the hole depth, is prepared by spin-coating, and a thin layer of uncrosslinked PDMS is deposited onto the film by spin-coating. This film is then placed on top of the surface of holes, while they remain in equibiaxial tension, and thermally crosslinked. Upon release of the pressure, the biaxial tension is released and the thin film forms hollow, hemispherical shells on top of the surface of holes. (See, FIG. 6G.) Such shells can then buckle, and "snap-through" between two geometries on the surface, responsive to an external stimulus.

FIG. 8 schematically illustrates another method for fabricating a shell-decorated surface. A thin elastomeric film can be placed on a substrate with a plurality of, and/or periodic holes therethrough. A thin layer of uncured elastomer ensures adhesion between the film and substrate. Upon applying a vacuum, the thin film is pulled down through the substrate holes. Positioned therein, with curing and subsequent substrate removal, a corresponding surface configuration (e.g., hemispherical shells) is provided.

Regardless of surface fabrication or resulting configuration, various external stimuli, of the sort described herein, can be used to effect geometric transition. Without limitation, application of an electric field is schematically illustrated in FIG. 9. Each side of a shell-decorated surface configuration (e.g., such as, but not limited to, that fabricated in FIG. 8) can be further modified to include a metal or metallic coating. With applied voltage thereacross, the coatings function as electrodes to induce or trigger spontaneous geometric/shaped transformation of the sort described herein (e.g., the onset of an elastic instability through a snap-through transition). Various other stimuli can be used or applied, depending on surface component material, structure and/or configuration, such stimuli including but not limited to chemical and magnetic stimulation and electromagnetic radiation such as but not limited to radio waves, microwaves, x-rays, and gamma rays and infrared, visible and ultraviolet light, and combinations of such stimuli.

The effect of geometric pattern and length scales on controlling solid adhesion can be exploited to define the geometry of buckled features. The static change in adhesion from one geometric configuration to another state of topography can alter the adhesion over a range of at least 50% to 400% the conventional value of interfacial strength. For liquid wetting interactions, based on numerous accounts in the scientific literature, proper design of topographic features can enhance the hydrophobicity or hydrophilicity of a given material surface. Controlled instabilities can be used to demonstrate command-based changes of surface properties for liquid wetting and explore the impact of instability dynamics and the amplitude of buckled geometry on a liquid/solid interactions. Regardless of specific geometry, sensitivity, response time, and the resulting impact can be optimized for a particular surface substrate or system.

A range of instability structures and geometries can be fabricated from crosslinked polydimethylsiloxane (PDMS). As demonstrated, this material provides a convenient system for tuning bulk and interfacial contributions without convolution of significant viscoelastic contributions. This material can be used to fabricate the two structures highlighted in FIG. 5. In addition to quantifying the relationship between geometry, material, instability kinetics and force generation, and adhesion, this material and resulting structures can be used to define the impact of surface interactions on structural instabilities. Specifically, the determination of structural instabilities, or buckling phenomena, does not conventionally account for surface interaction forces relative to the elastic restoring forces of a material. As the size scale of structural geometries decreases below the inherent length scale for the importance of surface energetics, these forces cannot only perturb the critical load conditions for stability, but can alter the dynamics of geometric changes. Based on accepted theories on structural stabilities, the dynamics and sensitivity for these geometric changes should become faster on smaller length scales.

While crosslinked PDMS can provide clear insight into the mechanisms and limits of using controlled instabilities at polymer interfaces, strategic use of block copolymer architectures can also provide several advantages. Microphase separated elastomers, such as polystyrene-b-polybutadiene copolymers, can be synthesized and processed to have a wide range of microphase morphologies corresponding to their individual block components. (See, Park, C., Yoon, J., Thomas, E. L. "Enabling Nanotechnology with Block self-assembled Copolymer Patterns", *Polymer*, 44, 2003.) In thin films, or in the presence of external fields, these morphologies can be aligned with respect to existing interfaces. This capability provides a unique mechanism for relating structural morphology to the kinetics and response of our fabricated instability structures. For example, elastomers with a lamellar morphology can be fabricated with lamellae parallel and perpendicular to the surface of a spherical shell. By altering the orientation of the lamellae with respect to the instability motion, the material stiffness can be tuned to change the dynamics or alter the development of fatigue defects during use. Spherical, cylindrical, and lamellae morphologies can affect a given instability mechanism and impact interfacial adhesion. Experiments on the fracture mechanisms of diblock copolymer thin films have shown that defect growth can be significantly altered by surface morphology and equilibrium microphase morphology in the "bulk" of the thin film. Similar control over the cyclic lifetime of instability structures can be achieved with control of thin film morphology.

In addition to providing a model system relating polymer structure to the response property of an instability interface, block copolymer elastomers can be incorporated into instability-driven interfaces for antimicrobial-related applications. Antimicrobial surfaces with long lifetimes, selective and environmentally-friendly mechanisms, and economical fabrication can impact numerous technologies ranging from children's toys and catheter tubes to water-bound vehicles and military uniforms. The dynamic nature of the present controlled instability interfaces and their adaptability to a wide range of material chemistries offer an alterative approach to current methods for impeding or eliminating microbial attachment.

As a basis for understanding such an aspect of this invention, consider, by analogy, that attachment mechanisms have a finite time scale or kinetic nature, which are often specific to certain species or organisms. For objects that move at rates faster than the natural attachment mechanisms, bacterial attachment can be prevented or eliminated. A prime example is the attachment of mussels in oceanic waters: mussels attach to surfaces in low flow rate environments, but do not attach to a surface with a flow velocity above a critical rate.

A controlled instability interface can be designed, in accordance herewith, to have an inherent lateral or normal motion at a specified rate. For instance, interfaces can be fabricated from elastomeric block copolymers with end-blocks containing poly(ethylene oxide) (PEO). Such a material system can provide morphological properties of the sort to fabricate and control effective instability structures, while providing a synergetic link to current chemical strategies for anti-microbial/ anti-fouling surfaces. Other such materials include the polystyrene-b-polybutadiene block copolymers discussed above.

The design and fabrication of such an interface can include a range of geometries and triggering mechanisms. An initial interface design can employ the spherical shell instability illustrated in FIGS. 1 and 5. With this geometry, a bias can be designed into the structure to prefer a concave or convex curvature under equilibrium conditions. This bias allows a single trigger to initiate two movements. The trigger will initiate a "snap-through" and the subsequent return to the equilibrium curvature. Accordingly, pressure or electrical triggers, for instance, can be used to periodically initiate snap-through and return events, thus creating a "rolling interface." The onset, or triggering of a controlled instability may also be caused by various other environmental changes, such as mechanical loads, swelling, thermal fluctuations, or pH. In addition, such an approach can provide a unique avenue for exploring the kinetics of microbial attachment in native environments. The aforementioned design directly permits the tuning of interfacial rates, and direct measurements of the critical rate for impeding attachment can be quantified.

Controlled instabilities offer several advantages for the design of responsive interfaces. Two such advantages are fast response rates and tunable force-displacement response upon reconfiguration of the geometry. First, as demonstrated in FIG. 1, the response rate available through such a design is on the order of 15 Hz. This response is over two orders of magnitude faster than the typical response of shape memory polymers, and as discussed above, can be tunable with the geometry and/or material properties of a particular interfacial structure. Regardless, an increased response rate can be employed for applications such as release-on-command coatings and adhesives, on-command frictional changes, and instant modification of optical properties at an interface. The sensitivity of these controlled instabilities is a second such advantage. As demonstrated above, a large deformation can result from a small perturbation in force. Again, this inherent sensitivity can also be tunable, depending with geometry and material choice for a particular interfacial structure.

From another perspective, controlling surface topography, the force of deformation and/or reconfiguration can be used to affect or influence a variety of surface properties or functions (e.g., in situ modifications of interfaces, such as the solventless debonding of coatings or paints). By altering, the geometric and material stiffness, a map of force generation and dynamic response time in such micro- and nano-scale structures can be obtained and utilized for future applications.

Accordingly, as discussed below, the optical transmission properties of a material surface can be controlled. In a convex state, assembled shell structures can form a functional microlens array. In such representative embodiments and depending on material choice, each microlens structure can be optically active with a focal point above the structure surface. Upon transitioning to a concave curvature, the focal point of the shell structures is changed to beneath the shell surface. (See, FIGS. 10-11.) These transitions can occur locally (single lenses) or macroscopically to the entire microlens array depending upon the spacing and material properties.

Fabrication of such active surface strictures can be as described above: a budding criteria was generated by imposing an equibiaxial compressive stress (see, FIG. 6). Exposure of the convex microlens surface to oxygen-plasma generates a compressive force on the surface causing the topography to change to concave. This novel technique for microlens preparation is simple and robust, and is scalable to very small length scales across a multitude of materials. (See, examples 1-5, below.)

As a simple estimate, the curvature of the microlenses can be predicted by a simple conservation of surface area, where the area of the hole under equibiaxial tension should equal the surface area of the resultant spherical shell. While the critical stress that develops from the applied biaxial compression dictates the formation of lenses and is dependent on the film thickness (e.g., from nanometer (for instance, about 5 nm) to millimeter dimensions) and material properties, the critical strain for buckling is independent of material properties and thickness. The geometry of the microlenses was independent of film thickness for the limited range measured (without limitation, 15 to 60 µm). Therefore the ratio of the amplitude of the shell to the radius of the hole should be proportional to the applied strain (FIG. 12), where a is the radius of the hole, $\epsilon$ is the applied strain, and h is the shell's amplitude:

$$\frac{h}{a} = \sqrt{\varepsilon(2+\varepsilon)} \qquad (2)$$

As the spacing of shells decreases, the relationship of h/a deviates from this surface area conservation (FIG. 12A), an effect which can be attributed to the influence of the shell spacing due to mechanical coupling effects, which are unaccounted for in this model.

Figure 12B:
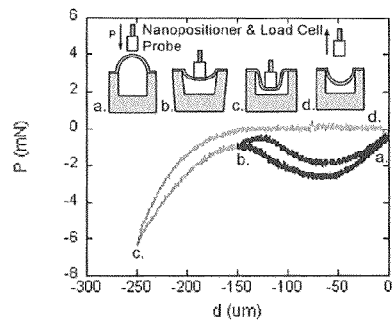

To control the transition from convex to concave curvature, the stress in the shell structure should be controlled. As described in the continuum mechanics of shell structures, at a critical applied stress an elastic instability can occur, similar to Euler buckling of a beam. This critical stress is determined by the balance of geometric and mechanical properties. As one example, individual shells can be snapped by applying a concentrated point force greater than or equal to ~6 mN to the shells (FIG. 12B). To initiate this snap-through, a cylindrical probe (radius=85 µm) connected to a load cell and nanopositioner was brought into contact with the apex of a single microlens. Applying a force below the critical force caused the shell to reversibly return to the convex geometry (black data). If the critical concentrated force is applied the shells snap to the concave state and remain there upon removal of the probe (gray data). This change is indicated by the contact force (P) changing to zero at a displacement (d) of –150 µm.

Alternatively, if a trigger mechanism is used to develop the critical stress in all shells simultaneously, then the entire surface of shells will change curvature (e.g., FIG. 10B). One way to achieve this switching of multiple lenses from convex to concave is by exposing the responsive surface to oxygen plasma treatment. The exposure of the surface to oxygen plasma leads to a conversion of the organo-silicon surface to silicon oxides. This conversion process causes a volumetric decrease on the surface of the PDMS film, triggering the shells to snap from convex to concave to minimize the development of tensile stresses in the outer surface layer.

To snap the shells from concave to convex, a triggering mechanism that causes volumetric expansion can be used. To demonstrate a simple mechanism, swelling the elastic network with an organic solvent develops an osmotic stress, similar to the Venus flytrap mechanism. Hexane was introduced to the PDMS surface, swelling the crosslinked network (FIG. 13A). The hexane can quickly diffuse through the thin silica layer on the surface (~10 nm) created by exposure to oxygen-plasma. As the surface swells, it expands initially until a compressive stress is generated due to the lateral confinement from the edges of each hole (FIG. 13B, where $\lambda_{rr}$ describes the lateral biaxial strain of the hole). This compressive stress leads to a growth of higher buckling modes until a critical strain is reached. At this critical value, the shell undergoes a snap-through transition to the more stable convex state. Regardless of a complete description of the shell mechanics, this transition in stress state can be associated with volumetric expansion in the buckled film, a mechanism that can be associated with a variety of other environmental changes (pH, light, temperature, etc.).

One advantage of shell structures, as illustrated with several surfaces embodiments of this invention, is the tendency to transition through a "snap" instability. Without limitation as to any one theory or mode of operation, "snap" instabilities differ from smooth elastic instabilities in their ability to undergo large magnitude geometric changes through short timescales. The transition from this pre-snap, largely concave state to the post-snap, convex state in our shell surfaces (with a thickness of 35 µm) takes approximately 30 ms (note: the timescale measurement is limited by the resolution of our camera at 30 fps). As in the Venus flytrap, the timescale for this snap-through transition is dictated by the smallest length scale in the system, in this case by the thickness of the shell. The timescale for the snap-through of the Venus flytrap, $\tau_p \approx 100$ ms, is governed by:

$$\tau_p \approx \frac{\mu t^2}{kE} \qquad (3)$$

where µ is the viscosity of the swelling fluid, t is the film thickness, k is the hydraulic permeability, and E is Young's modulus. (Y. Forterre, J. M. Skotheim, J. Dumais, L. Mahadevan, *Nature* 2005, 433, 421; M. A. Biot, *J. Appl. Phys.* 1941, 12, 155; J. M. Skotheim, L. Mahadevan, *Proc. R. Soc. London, Ser. A* 2004, 460, 1995.) The transition time for the snapping surface shells also obeys this scaling. To demonstrate, the snap transition time was plotted as a function of shell thickness (FIG. 13C). The predicted trendline is based on a measured elastic modulus (E=4 MPa) and literature values for the permeation of hexane through PDMS (µ/k~10-14 $m^2Pa^{-1}s^{-1}$). This suggests that the rate of the snap transition is predictably tuned with the geometry and material properties of the shell structures.

Designing a surface that undergoes snap, not smooth, instability transitions is also linked to the balance of materials properties and geometry. Forterre et al., supra, showed that a dimensionless geometric parameter $\alpha = a^4/R^2t^2$ determines the nature of closure for the Venus flytrap leaves as either snapping or smooth closure, where R is the radius of curvature, and a and t were defined above. They determined that $\alpha > 0.8$ was necessary for leaf snapping. Similarly, this transition in the context of classical shell mechanics, a dimensionless parameter $\xi = h/t$ can be used for spherical shell under fixed edge conditions. For this boundary constraint, $\xi$ must exceed a value of 2. While neither parameter completely describes the boundary conditions of the microlenses presented here, they represent lower limits required for shell snap-through. Shell geometry of the sort described herein has values of $\alpha$ (19.0) and $\xi$ (3.7) which greatly exceed the previously-mentioned critical values of both $\alpha$ and $\xi$.

As an initial demonstration of a responsive property of such surfaces, note the utility of these surfaces as responsive microlens arrays for optical display applications. In a convex state, the assembled shell structures form a functional microlens array (FIG. 14) with a focal point above the structure surface. Upon transitioning to a concave curvature, the focal point of the shell structures is changed to beneath the shell surface (FIG. 14). These transitions can occur locally (single lenses) or over the entire microlens array depending upon the spacing, material properties, and specific nature of the triggering mechanism. In addition to optical properties, the controlled, responsive topographical changes can be used to alter a wide range of properties from friction to wetting.

As mentioned above, applying a compressive or tensile force to a confined thin plate can lead to either buckling, wrinkling, or crumpling—as would be understood in the art. For a thin plate, the equilibrium shape is determined by a balance of the elastic plate's bending and stretching energy since the in-plane strain is minimal for a thin geometry. The stretching energy scales linearly with the plate thickness, t, while the bending energy scales as $t^3$, therefore as the plate thickness decreases, the stretching energy term dominates and the plate bends significantly to reduce the in-plane strain. As a result, the circular plates buckle under lateral compression and form equilibrium structures with high curvatures, due to the plate's preference for bending.

The specific topography, or shape, of the microstructures is determined by the initial geometry and material properties of each plate, and the applied biaxial strain (FIG. 15). The plate stiffness, D is given by:

$$D = \frac{Et^3}{12(1-v^2)} \quad (4)$$

where E is the elastic modulus, t is the plate thickness, and v is Poisson's ratio. (S. P. Timoshenko, Gere, J. M., *Theory of Elastic Stability*, 2nd edn., McGraw-Hill Book Company, New York, 1961.) The critical compressive stress of the plate, $\sigma_c$, determines the stress required to cause a circular plate to buckle and form a shell:

$$\sigma_c = \frac{k^2 D}{a_i^2 t} \quad (5)$$

where $a_i$ is the initial plate radius, and k is a numerical constant for each buckling mode. The first buckling mode, similar to the Euler buckling of a column, is an axisymmetric buckle which for a circular plate has the rotational symmetry of a spherical microlens (FIG. 16A). Using the constitutive relationship between biaxial stress and strain, $\epsilon$, we solve for the critical biaxial strain to buckle a circular plate:

$$\varepsilon_c = \frac{k^2}{12(v+1)}\left(\frac{t}{a_i}\right)^2 \quad (6)$$

The critical strain required to buckle a circular plate is dependent on k, which can be determined through classical plate theory. From classical plate theory, the equilibrium equation of a circular plate is:

$$r^2 \frac{d^2\phi}{dr^2} + r\frac{d\phi}{dr} + \left(\frac{Pr^2}{D} - 1\right)\phi = 0 \quad (7)$$

where r is the distance along the radius of the plate, $\phi$ is the change in amplitude, h, with respect to the change in r, and P is the applied equibiaxial compressive load. This equation is solved using Bessel functions and applying the boundary conditions for a simply supported plate which dictate that there is no rotation along the edge of the plate. The solution to equation 7 allows the first buckling mode constant to be determined by solving the Bessel function, J, for its smallest root:

$$kJ_0(k)-(1-v)J_1(k)=0 \quad (8)$$

Assuming $v \approx 0.49$ for PDMS, k=2.16 for the first buckling mode of a simply supported circular plate under biaxial compression. This value is used in equation 6 to determine the strain, $\epsilon$, required for the first mode of buckling for a circular plate of a given geometry, which is plotted as a solid line in FIG. 17B. The data below this line did not buckle while the data points above it did exhibit buckling. The aspect ratio of the shells, i.e., ratio of shell height (h) to final hole radius, (a), can be approximated by conservation of surface area according to equation 2, above. (See, e.g., FIG. 17A)

According to classical theory, this assumption should be valid for thin plates, where $t/2a_i<0.1$, which is accurate for all the circular plates that exhibited buckling. Here, the strain is defined as the biaxial surface strain of the depression covered substrate. As $\epsilon$ increases, equation 2 continues to predict the microstructure aspect ratio, but the shape of the microstructure deviates from the lowest buckling mode, i.e., spherical shell. Shells exhibiting these stable, nonaxisymmetric buckling modes are depicted in FIG. 15 and FIG. 16B, where shells have three or four lobes in the circumferential direction.

Due to the boundary condition of asymmetric bonding at the plates' edge, and the change in volume in the encapsulated microwells, buckling always produces structures with a convex shape. During fabrication, the volume enclosed beneath the microstructures changes. Assuming ideal gases, the pressure change is given by $\Delta p = P_{atm}(V_i/V_f - 1)$, where $\Delta p$ is the change in pressure, $P_{atm}$ is the atmospheric pressure, and $V_i$ and $V_f$ are the initial and final volumes. If the structures form in a concave state, the volume of the encapsulated microwells decreases, leading to a pressure increase. This pressure increase always exceeds the pressure decrease associated with the convex structure formation, thus convex formation is preferential. Although the concavity of the structures is impacted by this pressure difference, the resultant shape is not significantly affected. For our microstructures, $\Delta p/E \sim 10^{-4}$-$10^{-2}$, making the effect of pressure change on the buckled plate geometry negligible for these materials. This relationship suggests that for softer materials or shallower hole depths, the pressure change may impact the resultant geometry.

In FIG. 17B, a phase diagram illustrates the applied biaxial compressive strains that cause non-spherical geometries for circular plates with different $t/a_i$. The data above the dashed line exhibits nonaxisymmetric geometries, while the data for circular plates in between the dashed and solid lines buckle and form axisymmetric spherical shells. The dashed line in FIG. 17B is empirical, but some insight into the onset and shape of the nonaxisymmetric shells can be gained by considering the bifurcation of a spherical shell. At an applied $\epsilon$, a spherical shell is created with h/a defined by equation 9. In this initial state, the base edge of the shell is resisting an applied bending moment related to a, $\epsilon$, and E. As demonstrated in the art, for spherical shells of $h/t \leq 3$, the applied bending moment is resisted by a stable surface of constant curvature. For spherical shells with h/t>6, the applied bending moment leads to the bifurcation and secondary buckling of the spherical shell, causing a break in asymmetry. This bifurcation leads to local bending to minimize in-plane strain, causing waves in the circumferential direction, and effectively resists the applied bending moment. The shape of the bifurcated shell is related to the surface metric tensor determination of the Gaussian curvature, similar to elastic sheets.

Additionally, the geometry of such bifurcated shells is at lease in part determined by the packing density and configuration of the patterned surface. In the case of hexagonally packed circular plates, the bifurcation of an individual spherical shell creates a microstructure with inflection points, creating a tri-fold symmetry (FIG. 15). This geometry influences the orientation of the shell's nearest neighbors. The shells couple together and the stress concentration from each of the three buckle folds of a single shell direct the inflection points of its nearest neighbor (FIG. 16). The geometric coupling of these shells is also evident when the shells exhibit a four-fold symmetry. Again, the stress concentration from the folds of the shell directs the inflection points of its nearest neighbors. This suggests a method for controlling the long-range order of these patterned features using defects to template order.

By changing strain through environmental triggers, the relationship between shell geometry and strain defines a responsive surface of microstructures that can dynamically change their shape. Depending on the material properties of the patterned surface, a variety of stimuli can be used to change the strain applied to the shell structures. As illustrated above, swelling of the PDMS network with hexane can be used to change the applied strain. When a hexane droplet is added to the surface of initially spherical shells (FIG. 18A-$ii$), the thin film shell swells initially, but is laterally confined by the edges of the unswollen hole below it, to which it is bound. This lateral confinement increases the compressive strain along the edge of the shell, which from equation 9 increases the height of the shell when a remains constant. Since the change in film thickness is negligible, the shell transition through a bifurcation point to form a stable, nonaxisymmetric geometry (FIG. 18B-$ii$). Upon evaporation of the solvent, the shell returns to its initial, spherical geometry. The swelling time required to induce this change is on the order of seconds.

The reverse topographical change can occur by changing the diameter of the hole below an initially nonaxisymmetric shell stricture. To demonstrate this change, the PDMS substrate below the thin film shell was swelled with hexane to increase the hole diameter (FIG. 18A-$i$). This increase in a causes a decrease in the compressive biaxial strain along the edge of the shell, which in turn decreases the height of the shell to achieve an h/t value where an axisymmetric shell can resist the relieved bending moment in a stable maimer (FIG. 18A-$ii$). Therefore, the initially nonaxisymmetric shell forms a spherical shell geometry. The timescale for this process is approximately an hour as the entire PDMS substrate needs to swell before the shell layer. This process allows the surface to return to its initial topography once the hexane evaporates.

As demonstrated, uncomplicated patterning techniques can be used to generate various surface topographies via classical plate buckling or confined crumpling. More specifically, the buckling of circular plates leads to the preparation of microstructures with rotational symmetry (e.g., spherical microlenses), tri-fold symmetry and quad-fold symmetry, with predictable aspect ratios. The geometry of such structures depends on plate material properties and geometry, together with the applied force during preparation. This approach that leads to patterns that are difficult, if not impossible, to achieve with other methods. Additionally, such patterns demonstrate dynamic, or responsive behavior.

More generally, such surface patterns can dynamically and reversibly change shape and aspect ratio by changing the strain applied to such structures (e.g., shell structures). Surface patterning of the sort demonstrated herein offers a unique approach for fabrication of a new generation of surface patterns, in particular in the context of biomimetic, stimuli-responsive materials.

EXAMPLES OF THE INVENTION

The following non-limiting examples and data illustrate various aspects and features relating to the articles/devices and/or methods of the present invention, including the fabrication of various stimuli-responsive surface articles comprising one or more of a variety of geometric structural components, as are available through the techniques described herein. In comparison with the prior art, the presents methods, articles and/or devices provide results and data which are surprising, unexpected and contrary thereto. While the utility of this invention is illustrate through the use of several articles/devices and geometric structural components which can be used therewith, it will be understood by those skilled in the art that comparable results are obtainable with various other articles/devices and geometries/structural components, as are commensurate with the scope of this invention. Without limitation, the following examples can relate more specifically to FIGS. 10-18.

Example 1

An SU-8 2100 negative photoresist (Microchem®) was deposited by spin-coating at 1000 rpm for 1 minute onto a clean silicon wafer. The resist was then pre-baked at 90° C. for 10 minutes exposed for 70 seconds (OAI 500W DUV, intensity=20 mJ/cm$^2$) with a mask of circles prepared by Pageworks. The exposed resist was post-baked at 90° C. for 1 minute and developed in SU-8 Developer (Microchem®) for 10 minutes to reveal cylindrical posts with a height of 244 μm.

Example 2

Substrate Fabrication

Crosslinked PDMS films are prepared by thoroughly mixing Dow Corning Sylgard™ 184 oligomer with catalyst (10 to 1 by weight) and then degassing under vacuum for 1 hour. The degassed mixture was cast onto the cylindrical photoresist posts and cured at 110° C. for 30 minutes to yield 1.5 mm thick PDMS films with 244 μm holes on the surface.

Example 3

Microlens Fabrication

The crosslinked PDMS film with surface holes is clamped over a circular hole and inflated. This places the PDMS film in an approximate equibiaxial strain which is quantified by measuring the original and strained dimensions of the surface holes by optical microscopy (Ziess, Variotech). A thin film of crosslinked PDMS (h=15-60 μm) is placed on top of the array of inflated holes with a thin layer of uncrosslinked PDMS at the interface between the two layers. The sample is then heated at 110° C. for 30 minutes to allow the remaining uncrosslinked PDMS to cure while the substrate is inflated. The pressure is released, thus compressing the thin film and creating the spherical shells on the surface.

Example 4

Microlens Characterization

The height of the microlenses was characterized by reflective mode optical microscopy (Zeiss, Axiovert). Optical projection through the microlenses was performed by transmission mode optical microscopy (Zeiss, Axiovert). Geometry of the convex and concave shells was examined by confocal microscopy (Leica Confocal Optical Microscope, reflective mode, 20×), and scanning electron microscopy (Joel 6320FXV FESEM, SEI mode, 110 kV, gold-coated). The microlenses were swelled with hexane (VWR) and observed via optical microscopy.

Example 5

Oxygen Plasma Procedure

Using Harrick Plasma's Plasma-Cleaner (PDC-001), a vacuum of 200 mTorr is pulled on the sample. Oxygen gas is then added to the chamber bringing the pressure to 500 mTorr, and then brought back to a vacuum pressure of 200 mTorr. Using a "High" RF level, the sample is exposed to oxygen plasma for 30 seconds. The exposure of the responsive interface to oxygen plasma leads to a conversion of the organo-silicon surface to silicon oxides. During this process, the silicon-containing chain segments diffuse to the surface and are converted to $SiO_2$. (See, e.g., Egitto, F. D., Matienzo, L. J. *J. Mater. Sci.* 2006, 41, 6362-6373.) Long exposure times are not required because the majority of organo-silicon bonds are converted to silicon-oxides within 30 seconds. The diffusion of organo-silicon bonds to the surface, leading to a denser region of chemical bonds, causes the thin, glassy layer to be in tension. The elastic membrane below the thin, glassy, silicon-oxide layer applies a compressive force to the surface, similar to surface wrinkling, which causes the convex shells to snap-through to the concave state. (See, e.g., Chan, E. P.; Crosby, A. J. *Adv. Mater.* 2006, 18, 3238-3242)

Example 6

Swelling of the PDMS thin film was done by depositing a 10 μl droplet of hexane (VWR) onto the surface of spherical microlens. The swelling of the PDMS substrate was done in a bath of hexane, and the substrate was swollen to equilibrium.

We claim:

1. A method of effecting surface response to an external stimulus, said method comprising:
   providing a surface component comprising a 3-dimensional structural component, said structural component characterized by a combination comprising a material identity, a length scale and a defined first geometric configuration; and
   stimulating said structural component for one of a time and a magnitude at least sufficient to induce a non-linear geometric displacement of said structural component, said stimulating external to said surface component and at least partially sufficient to change a volume of a recess located below said structural component;
   wherein said structural component comprises an elastomeric polymer.

2. The method of claim 1 wherein said stimulating comprises changing a mechanical pressure, changing a temperature, changing a pH, solvent swelling, applying an electrical field, applying an electromagnetic radiation, or a combination thereof.

3. The method of claim 1 wherein said non-linear displacement induces a snap-through elastic instability within said structural component.

4. The method of claim 1 wherein said first geometric configuration is a curved first geometric configuration.

5. The method of claim 4 wherein said curved first geometric configuration is selected from a spherical shell and a tubular column.

6. The method of claim 1 wherein said surface component comprises a plurality of said structural components at a density on said surface component.

7. The method of claim 6 wherein said non-linear displacement is a function of said density.

8. The method of claim 1 wherein said surface component comprises a plurality of said structural components, at least a portion of said plurality of structural components having a concave first geometric configuration.

9. The method of claim 8 wherein said stimulating is solvent swelling of said structural components.

10. The method of claim 8 wherein said stimulating induces a convex second configuration of said structural components.

11. The method of claim 1 further comprising counter-stimulating said structural component, said counter-stimulating at least partially sufficient to provide said first geometric configuration.

* * * * *